(12) United States Patent
Brandwine et al.

(10) Patent No.: US 8,549,347 B1
(45) Date of Patent: Oct. 1, 2013

(54) TECHNIQUES FOR NETWORK REPLICATION

(75) Inventors: Eric Jason Brandwine, Haymarket, VA (US); Swaminathan Sivasubramanian, Seattle, WA (US); Bradley E. Marshall, Seattle, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 344 days.

(21) Appl. No.: 12/973,744

(22) Filed: Dec. 20, 2010

(51) Int. Cl.
*G06F 11/00* (2006.01)

(52) U.S. Cl.
USPC ............................. 714/4.11; 709/224; 726/15

(58) Field of Classification Search
None
See application file for complete search history.

(56) References Cited

U.S. PATENT DOCUMENTS

| | | | |
|---|---|---|---|
| 6,411,967 B1 | 6/2002 | Van Renesse | |
| 6,529,953 B1 | 3/2003 | Van Renesse | |
| 6,724,770 B1 | 4/2004 | Van Renesse | |
| 7,068,666 B2 | 6/2006 | Foster et al. | |
| 7,068,667 B2 | 6/2006 | Foster et al. | |
| 7,124,289 B1 | 10/2006 | Suorsa | |
| 7,131,123 B2 | 10/2006 | Suorsa et al. | |
| 7,152,109 B2 | 12/2006 | Suorsa et al. | |
| 7,409,577 B2 * | 8/2008 | Wing et al. | 714/4.12 |
| 7,496,664 B2 | 2/2009 | Hannel et al. | |
| 7,516,206 B2 | 4/2009 | Henseler et al. | |
| 7,620,535 B2 | 11/2009 | Shevenell et al. | |
| 7,685,148 B2 | 3/2010 | Engquist et al. | |
| 7,739,328 B1 | 6/2010 | Champion | |
| 2002/0062388 A1 | 5/2002 | Ogier et al. | |
| 2004/0230670 A1 | 11/2004 | Schmidt-Karaca et al. | |
| 2005/0188105 A1 | 8/2005 | Reinhard et al. | |
| 2007/0067296 A1 | 3/2007 | Malloy et al. | |
| 2007/0239987 A1 | 10/2007 | Hoole et al. | |
| 2007/0271453 A1 | 11/2007 | Pohja et al. | |
| 2007/0294673 A1 | 12/2007 | Guerrera et al. | |
| 2008/0313318 A1 | 12/2008 | Vermeulen et al. | |
| 2009/0241108 A1 * | 9/2009 | Edwards et al. | 718/1 |
| 2009/0248896 A1 | 10/2009 | Cohn | |
| 2009/0249473 A1 | 10/2009 | Cohn | |
| 2009/0285207 A1 | 11/2009 | Cohen et al. | |
| 2010/0138488 A1 | 6/2010 | Fletcher et al. | |
| 2011/0131648 A1 * | 6/2011 | Gargett | 726/15 |

OTHER PUBLICATIONS

International Search Report and Written Opinion, date of mailing Mar. 6, 2012, PCT application No. PCT/US2011/065862, 6 pages.
"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.

(Continued)

*Primary Examiner* — Christopher McCarthy
(74) *Attorney, Agent, or Firm* — Davis Wright Tremaine LLP

(57) ABSTRACT

In response to a request to duplicate a network, the network is duplicated. The duplicate network includes one or more virtual devices that correspond to one or more devices in the network being duplicated. The devices of the duplicate network are communicatively arranged in a manner consistent with a topology of the network being duplicated. Once the duplicate network is created, access to the duplicate network is provided.

27 Claims, 8 Drawing Sheets

(56) References Cited

OTHER PUBLICATIONS

"Cisco IP Solution Center MPLS VPN Management 4.2," Cisco Systems, Inc., retrieved Jan. 24, 2007, from http://www.cisco.com/en/US/products/sw/netmgtsw/ps5332/products_data_sheet09186a008017d7 . . . , 5 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"MPLS-enabled VPN Services," Data Connection, retrieved Jan. 26, 2007, from http://www.dataconnection.com/solutions/vpn_vlan.htm, 1 page.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Sofiricity, retrieved May 3, 2006, from http://www.softricity.com/products/, 3 pages.

Bellovin S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Dilley, J., et al., "Globally Distributed Content Delivery," IEEE Internet Computing, Sep./Oct. 2002, http://computer.org/internet, pp. 50-58.

Draves, R., "Default Address Selection for Internet Protocol version 6 (IPv6)," The Internet Society, Feb. 2003, retrieved Feb. 12, 2008, from http://tools.ietf.org/html/rfc3484, 24 pages.

Farinacci, D., et al., "LISP Alternative Topology (LISP-ALT)," The Internet Society, Nov. 13, 2007, retrieved Mar. 19, 2008, from http://tools.ietf.org/html/draft-fuller-lisp-alt-01, 21 pages.

Gruener, J., "A vision of togetherness," May 24, 2004, NetworkWorld, retrieved May 3, 2006, from, http://www.networkworld.com/supp/2004/ndc3/0524virt.html, 9 pages.

Hinden, R., et al., "Internet Protocol Version 6 (IPv6) Addressing Architecture," The Internet Society, Apr. 2003, retrieved Feb. 12, 2008, from http://tools.ietf.org/html/rfc3513, 26 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Metz, C., et al., "IPv4—Mapped Addresses on the Wire Considered Harmful," Internet Engineering Task Force, Oct. 21, 2003, retrieved Mar. 27, 2008, from http://www.stindustries.net/IPv6/ietf-internet-drafts/draft-itojun-v6op . . . , 5 pages.

Nordmark, E., "Stateless IP/ICMP Translation Algorithm (SIIT)," The Internet Society, Feb. 2000, retrieved Mar. 19, 2008, from http://tools.ietf.org/html/rfc2765, 26 pages.

Resilient Overlay Networks, "Overview," retrieved Feb. 11, 2008, from http://nms.csail.mit.edu/ron, 5 pages.

Shankland, S., "Sun to buy start-up to bolster N1," Jul. 30, 2003, CNet News.com, retrievec May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Subramanian, L., et al., "OverQoS: An Overlay Based Architecture for Enhancing Internet QoS," 1st Symposium on NSDI, Mar. 2004, retrieved Feb. 11, 2008, from http://nms.1cs.mite.edu/papers/overqos-nsdi04.html, 15 pages.

Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2): 103-117, 15 pages.

\* cited by examiner

TECHNIQUES FOR NETWORK REPLICATION

CROSS REFERENCE TO RELATED APPLICATIONS

This application incorporates by reference for all purposes the full disclosure of U.S. patent application Ser. No. 12/060,074, filed on Mar. 31, 2008, having the title "Configuring Communications Between Computing Nodes."

BACKGROUND

Remote computing services are often utilized in order to operate a network on behalf of various users. An organization, for example, may remotely operate a plurality of computing devices that are in communication with one another. The computing devices may be configured in a network according to the organization's needs, utilizing various network devices such as routers, switches, firewalls, and the like. Further, the computing and network devices may include virtual and/or actual computing devices. For example, an organization's network may include a plurality of virtual machines in communication with one another by one or more virtual network devices, thereby forming a virtual network that overlays an actual network. The computing devices may be programmed to communicate according to the topology of the virtual network and various techniques may be used to enable the communications to travel over the actual network which the virtual network overlays.

In some instances, it is desirable to duplicate a network, or at least a portion thereof. For example, an organization may wish to test a network while still allowing the network to function. Similarly, an organization may wish to simulate various stresses on its network without actually subjecting the network to the stresses. The organization may wish to test how a modification to its network may function or may wish to recreate events that caused one or more events, such as a network failure. Generally, there are various reasons why duplication of a network can be useful. Network duplication, however, can be an arduous and time-consuming process, generally requiring substantial intervention configuring a new network to be a duplicate of an old network.

DETAILED DESCRIPTION

Figure 1:
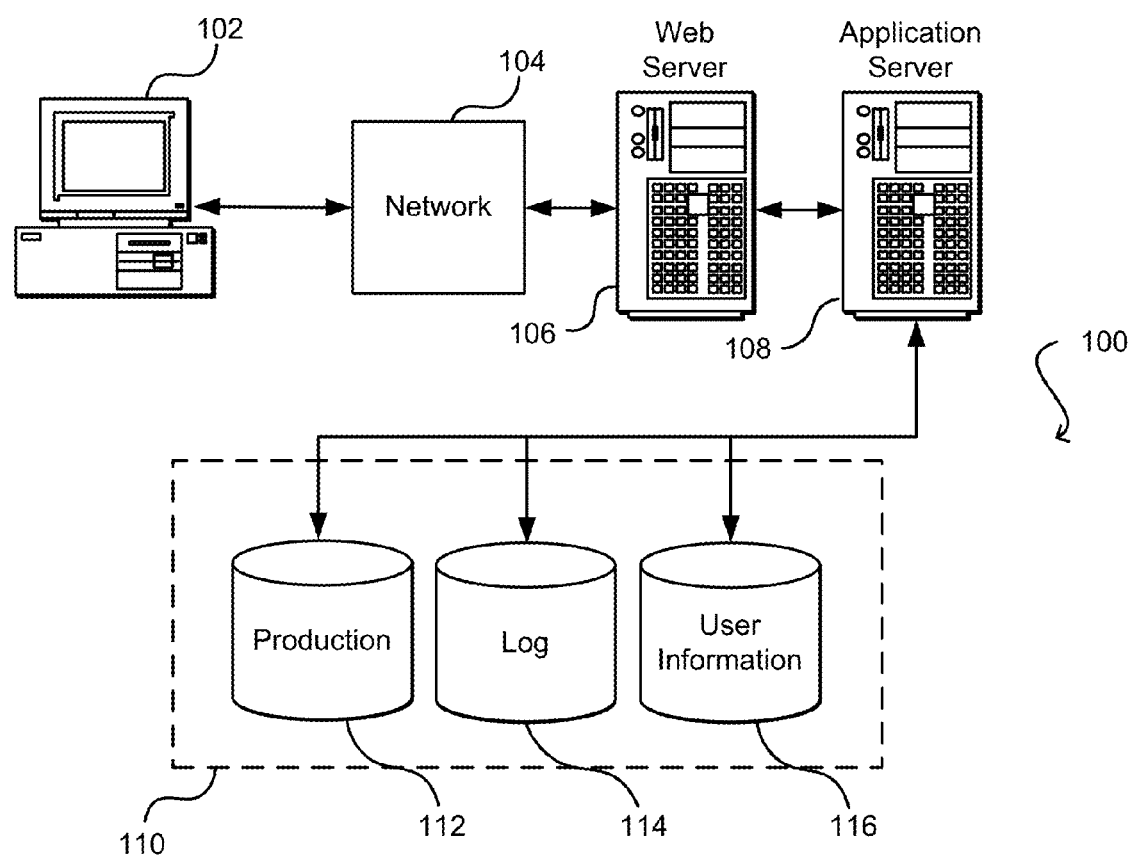
FIG. 1 illustrates an environment in which various embodiments can be implemented.

Techniques described and suggested herein include systems and methods useful for processes such as network duplication. In an embodiment, a request to duplicate at least a portion of network is received and at least that portion of the network is duplicated, responsive to the request. The request may be initiated by a user, such as a network administrator, who accesses the network remotely. Access of the network may be through various Application Programming Interfaces (APIs) of a web service layer provided for the purpose of allowing users to access their network(s). As an example, the network may be operated on behalf of the user (and/or an organization associated with the user) by another organization that provides computing resources used for operating the network. The computing resources may be, as an example, located in one or more data centers and remotely accessed by the user using APIs of web services, although other technologies may be used. One or more of the APIs may be provided for the purpose of network duplication. The one or more data centers may additionally be used to implement networks of other users that may access their networks remotely. The computing resources may include computing devices, storage devices, switches, routers, gateways, hubs, and other devices that may be used in operating a network, including some devices described below and, generally, any device suitable for use in a network environment.

In an embodiment, the network that is duplicated is a virtual overlay network. In an embodiment, the network that is duplicated comprises a network of one or more virtual devices that overlay a network of physical devices. The physical devices may include one or more hub, switch, router, gateway, firewall, server, storage device, and/or one or more other devices that can be used in a network environment. Similarly, the virtual devices may include one or more virtual hub, virtual switch, virtual router, virtual gateway, virtual firewall, virtual server, virtual storage device, and/or one or more other devices that can be used in a network environment. As used herein, when clear from context, virtual devices may be referred to without the word "virtual." There may not be a one-to-one correspondence between a set of devices comprising the virtual network and the set of devices comprising the physical network that is overlaid by the virtual network. As an example, one physical device may be used to implement multiple virtual devices. A computing device, for example, may be used to implement multiple virtual machines. As another example, multiple physical devices may be used to implement a single virtual device. A virtual storage device, for instance, may be implemented by multiple physical storage devices. In addition, while multiple virtual devices may be implemented by a single physical device and while multiple physical devices may be used to implement a single virtual device, some virtual devices may be implemented by a single physical device. A virtual storage volume, for instance, may be implemented by single physical storage device.

In an embodiment, a user who makes a request is provided the opportunity to specify one or more parameters regarding how a network may be duplicated. In one embodiment, the user is able to identify one or more portions of a network, such as one or more subnetworks, to copy. In addition, devices in a user's network may be tagged with various characteristics. A tag for a device may relate to the device's purpose in the network (such as the type of application the device is used to support), may generally relate to any aspect of the device, or may have no apparent relation to a characteristic of the device. A user, in an embodiment, may specify one or more tags as a condition for inclusion or exclusion from the duplicate network. For example, a user may specify that only devices tagged with "production" should be included in a duplicate network.

Other parameters may relate to the fidelity of objects in a duplicate network to the network to be copied. For example, if a network to be copied includes a virtual machine, the user may have various options for specifying requirements for a duplicate virtual machine. The user may, for instance, specify low fidelity for the machine whereby a duplicate network may simply have a corresponding virtual machine. The user may specify higher fidelities where the capabilities of the corresponding virtual machine match the original virtual machine to various degrees. The user may specify, for instance, that the duplicate virtual machine should be implemented with minimum processing capabilities, block storage available, and/or abilities to run various software applications. Similarly, the user may specify very high fidelity where, for instance, a duplicate virtual machine should be implemented on a machine using a particular processor model. Generally, any type of characteristic relating to how closely a duplicate network object should match an object being duplicated may be provided to the user for specifying copy fidelity. As another example of parameters that may be specified, a user may specify various Internet protocol addresses of devices in a network that should be used for corresponding devices in a duplicate network.

In an embodiment, users are also able to specify at least one copy type for devices in a network to be copied. In one embodiment, users are able to specify copy types such as "shallow" or "deep" copies in a network to be copied, although other types of copies may be provided for selection. With a shallow copy of a network object, a new instance of the object may be declared. The new instance may operate, retrieving information regarding the original object's state before the copy, as needed. A shallow copy of a network object may be, for example, a copy-on-write (COW) overlay of the network object. With a deep copy of a network object, a complete copy of a store of memory comprising information about the object's state may be made for a duplicate copy to enable the duplicate copy to operate independently without the need to retrieve information regarding the original object's state before the copy from another source.

As discussed, when the user submits a request that a network be copied, in response to the requests, the network is copied and access to the network is provided to the user, in an embodiment. Copying the network may include creating one or more virtual duplicate devices that correspond to one or more virtual devices of the network being copied. Virtualization or other technology used to create and/or operate the virtual devices of the network being copied may also be used to create and operate corresponding duplicate devices. In addition, any templates used to create devices in the network being copied may be used to create duplicate devices. In other words, devices and their duplicate devices may be created from common templates. Copying the network is done in a manner consistent with any parameters specified by the user. The specified parameters may apply to the whole network being copied and/or to individual network objects being copied. In some embodiments, users are able to specify different parameters for each network object to be copied and/or subsets of the network objects to be copied.

Providing access to the duplicate network may be done in a variety of ways. Generally, a user, such as a network administrator, is able to operate the duplicate network in various ways and for various purposes. As one example, the user may apply various stresses on the duplicate network for testing purposes. The user may also record network events and replay those events in the duplicate network for forensic purposes. As another example, the user may use the duplicate network in connection with the network being copied to provide additional capacity or, generally, to have available the additional computing resources of the duplicate network. A user may also modify the duplicate network, such as to test how modifying the network that was copied would affect its performance. Details regarding the various embodiments, including additional examples, are described in more detail in the following paragraphs.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
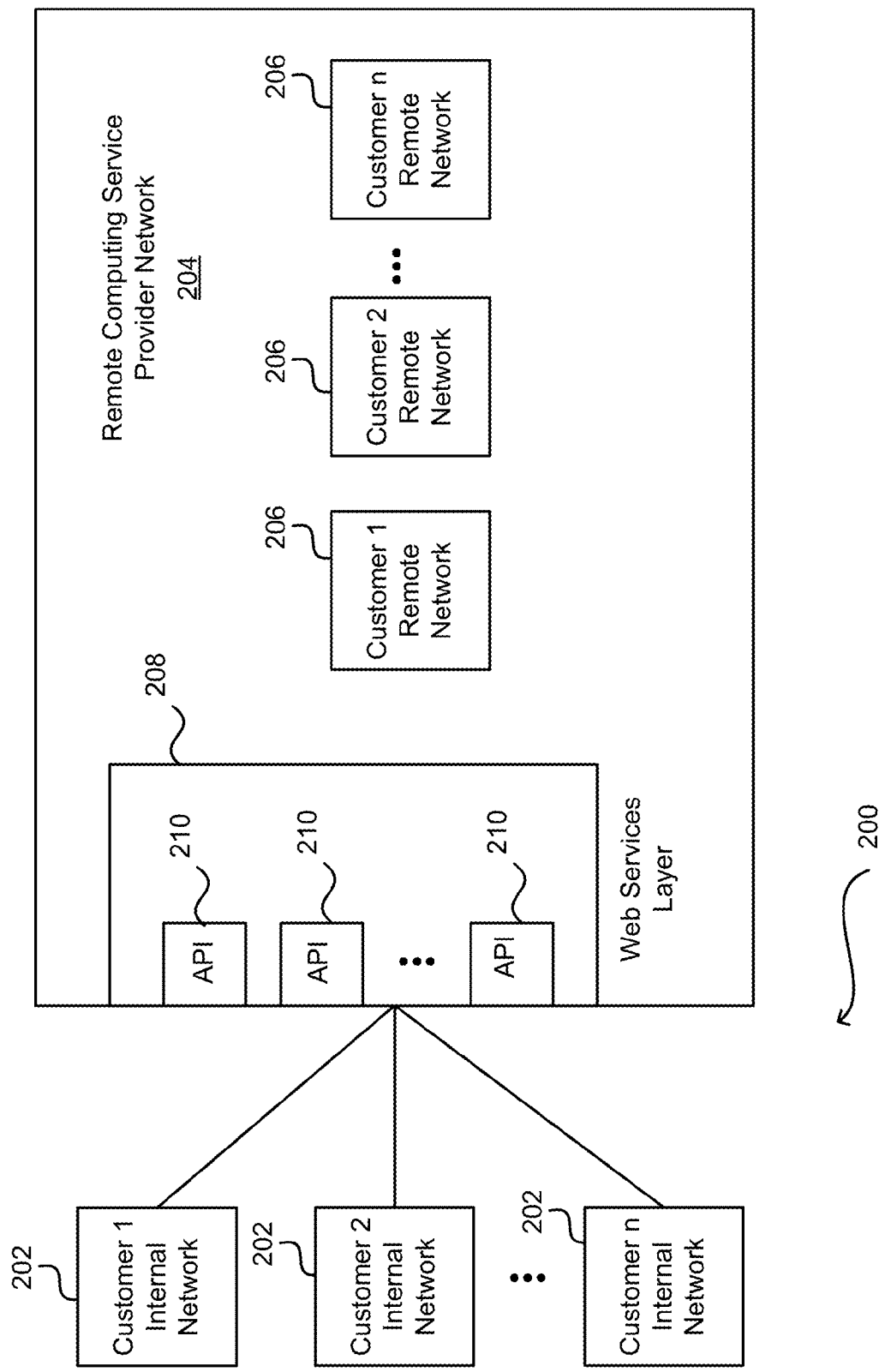
FIG. 2 illustrates an environment which may utilize various components of the environment shown in FIG. 1.

FIG. 2 provides an illustrative example of an environment 200 that may make use of one or more components shown in FIG. 1 and which may be used to practice various embodiments of the present disclosure. In the environment 200 pictured in FIG. 2, a plurality of customer internal networks 202 are communicatively connected with a remote computing service provider network 204. While FIG. 2 illustrates a plurality of customer internal networks 202, embodiments of the present disclosure may be implemented in environments in which there are one or zero customer internal networks 202. Returning to the illustrated embodiment in FIG. 2, the customer internal networks 202 may be, for instance, intranets of organizations that utilize remote computing services of the remote computing service provider. As an example, a customer may utilize its own internal network for executing various applications used during the customer's operations while using computing resources provided as a service using the remote computing service provider network 204 for other applications.

In an embodiment, the remote computing service provider network 204 is implemented in a data center operated by a remote computing service provider. A data center may be a facility in which various computing resources are utilized. Computing resources include computing devices, storage devices, network devices such as routers, switches, firewalls, and the like and, generally, any device that may be used in connection with a network of computing devices. The remote computing service provider network 204 may be implemented with a plurality of data centers that communicate with one another over a communications network. The remote computing service provider may, for instance, operate a network of data centers in various geographic locations. As shown in the drawing, the remote computing service provider network 204 includes one or more customer remote networks 206 which, in this example, are networks operated on behalf of corresponding customers. Various operations of a customer may be operated using a remote customer network 206. For instance, a customer may utilize a customer internal network 202 for internal operations (such as accounting, human resources, electronic mail, and the like) while utilizing a customer remote network 206 for external operations (such as operating a network of servers and data stores to provide a website or other information resource to the public or other users external to the customer's organization). Generally, a customer may utilize a customer internal network 202 and/or customer remote network 206 for any suitable purpose. One or more of the customer remote networks 206 may be virtual overlay networks, such as those described in accordance with U.S. patent application Ser. No. 12/060,074, filed on Mar. 31, 2008, having the title "Configuring Communications Between Computing Nodes," and which is incorporated herein by reference for all purposes.

In an embodiment, the remote computing service provider network 204 includes a web services layer 208 having a plurality of application programming interfaces (APIs) 210. The web services layer 208 may be implemented in a computer system that is operable to receive web service calls and respond accordingly, such as by instructing one or more other computer systems to perform an action based on the request. The web service calls may be made using various web service APIs 210 provided to users for various reasons. For instance, one API may be for the purpose of network duplication, as described in accordance with the various embodiments of the present disclosure. Other APIs may be for other purposes, such as provisioning virtual computing instances, otherwise configuring a network, and, generally, remotely operating computing resources on behalf of a user utilizing the APIs. In addition, while web service APIs are provided for the purpose of illustration, any way of operating computing resources, either remotely or locally, may be used in accordance with various embodiments.

Figure 3:
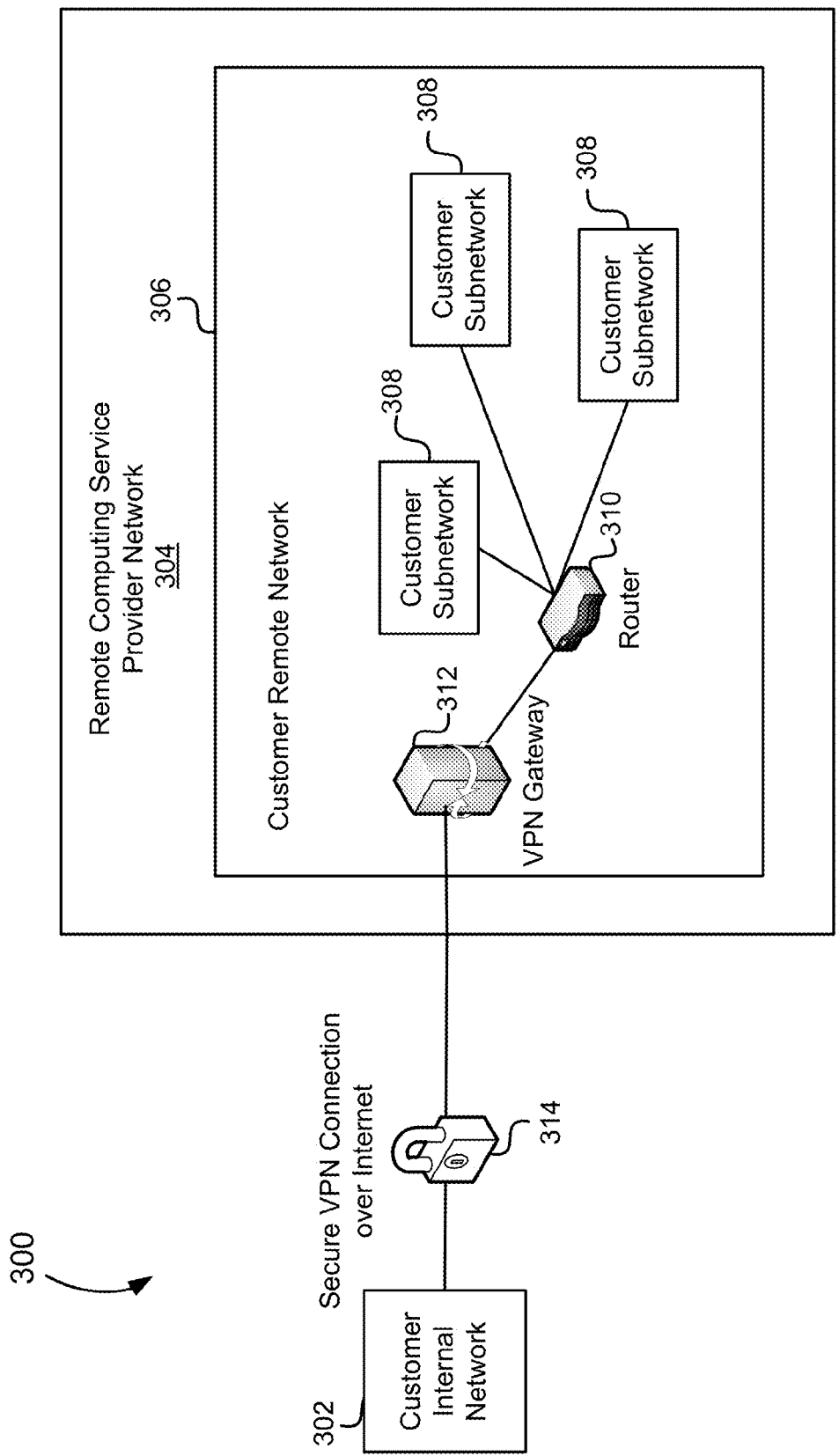
FIG. 3 illustrates a portion of the environment of FIG. 2 in greater detail.

FIG. 3 shows an illustrative example of an environment 300 which may be a sub-environment of the environment 200 illustrated above in connection with FIG. 2. As illustrated in FIG. 3, the environment 300 shows a portion of the environment 200 as it applies to a particular customer. In this example, a customer has its own customer internal network 302 which accesses a remote computing service provider network 304 in which a customer remote network 306 is operated by a remote computing service provider 304 on behalf of the customer. While the customer is shown to have several subnetworks 308 in FIG. 3, a customer may have only one network or may have more subnetworks than shown in the drawing.

The customer remote network 306, in an embodiment, includes a plurality of customer subnetworks 308. In an embodiment, one or more of the customer subnetworks are overlay networks of a network operated by the remote computing services provider. The customer, in the illustrative embodiment shown, may access the various subnetworks 308 through a router 310 and virtual private network (VPN) gateway 312 over a secure VPN connection over the Internet 314, although other ways of accessing the customer subnetworks 308 may be used. In an embodiment, the customer, from its customer internal network 302, establishes a secure VPN connection over the Internet and interacts with the customer subnetworks 308 through web service calls, although other ways of communicating with the various computing devices operating on behalf of the customer may be used. In an embodiment, a server of the customer internal network 302 communicates encrypted information to the VPN gateway 312 which decrypts the information and passes the decrypted instructions to the router 310. The router 310 then transmits the decrypted information to an appropriate customer subnetwork 308. Information from any of the customer subnetworks 308, whether responsive to any instructions sent by the customer internal network 302 or not, may be sent to the router 310, which passes the information to the VPN gateway 312, which encrypts the information and sends the information over the secure VPN connection 314 to the customer internal network 302.

While FIG. 3 shows a particular configuration for information flow for the purpose of illustration in accordance with various embodiments, other configurations may be utilized for the environment 300 or other embodiments. Generally, any suitable way of exchanging information among computing devices may be used. In addition, while several devices such as the VPN gateway 312 and router 310 are included in FIG. 3 for the purpose of illustration, other devices may be used for communication. In addition, the environment 300 shown in FIG. 3 is simplified and other devices other than those illustrated may be included in the environment 300 or in other embodiments. Possible devices include, but are not limited to, switches, servers, firewalls, data stores, hubs, other gateways, and the like.

Figure 4:
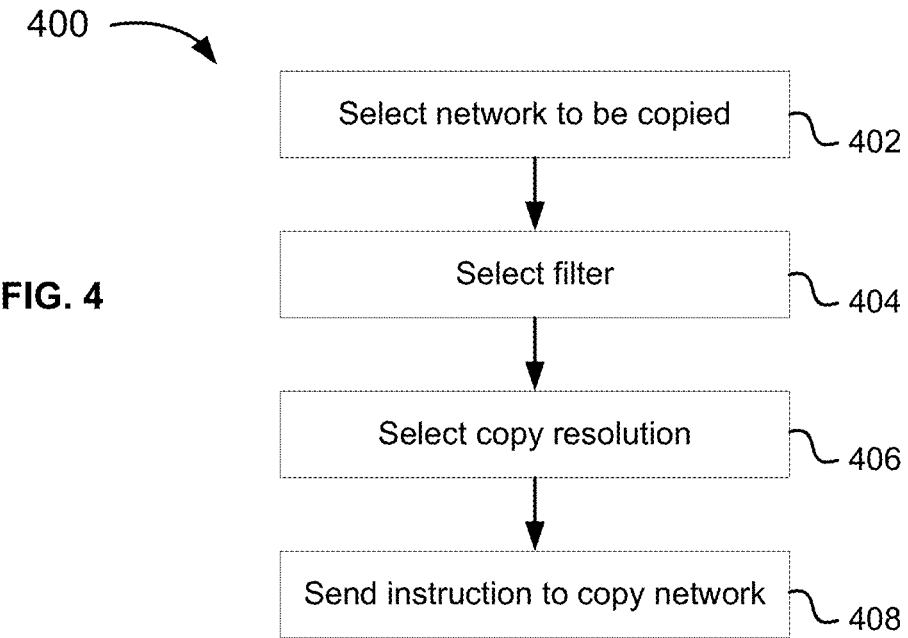
FIG. 4 is a flowchart for an illustrative example of a process for requesting a network duplicate, in accordance with an embodiment.

As noted above, various embodiments of the present disclosure provide for dynamic network replication. Accordingly, FIG. 4 shows an illustrative embodiment of a process 400 which may be used by a customer to copy one or more networks. Portions of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, a user selects 402 a network to be copied. Selection of a network to be copied may be accomplished in any suitable manner. For instance, in an embodiment that includes a remote computing services provider, a customer's network administrator or other user may utilize an interface, sometimes referred to as a management console, that allows the user to select a network that is being operated on behalf of the customer by a remote computing services provider. The interface may be provided to the customer by the remote computing services provider as a web page or may be an application executing on a computing device of the customer. The network that is selected may be a subnetwork of a larger network, a collection of subnetworks, or, generally, any collection of computing resources in communication with one another.

In an embodiment, users are provided the ability to apply one or more filters in order to have more control over the network to be copied. In an embodiment, various devices in a customer's network have one or more assigned tags. Tags may be automatically assigned or may be user assigned. For instance, devices may be tagged with device type tags, which may identify devices as being, for instance, a server, a storage device, a switch, or any other type of device. Users may also provide their own tags, in an embodiment. For example, if a customer uses a subnetwork for a different purpose than another subnetwork, the user may tag each device with a tag that corresponds to the purpose. Devices in one sub network may have, for instance, tags that identify the devices as part of a subnetwork used for production while other devices in another subnetwork may have tags that identify the devices as part of a subnetwork used for another purpose, such as billing. As another example, storage devices may be tagged with tags that identify the devices as either being primary storage devices or backup storage devices. Generally, any type of tag may be used for filtering. In addition, devices may have more than one tag and devices in separate subnetworks may share one or more of the same tag. Filters may also be based at least in part on the internet protocol (IP) addresses utilized by devices in the selected network. Accordingly, in an embodiment, when the user has selected a network to be copied, the user selects 404 any filters that he or she would like to apply to the selected network.

In addition, in an embodiment, users are provided the ability to select 406 a desired resolution for one or more network objects in the selected network. A resolution selected by the user may be used to determine how closely the copy of the network should match the network being copied. Characteristics of a resolution selectable by the user may include characteristics such as whether a copy is shallow or deep (as described more fully in connection with FIGS. 8 and 9), software installed on network objects, memory (volatile and/or non-volatile) of a network object, processing capabilities, and particular hardware characteristics, such as processor models, manufacturers, and the like. As an example, a user interested in a low resolution copy may specify that he or she would like a copy of similar devices that are networked together in the same manner. A user interested in a high-resolution copy may specify that certain devices should have a certain amount of memory, should include specific hardware devices, should have specific software installed on them and the like.

In an embodiment, when the user selects the copy resolution, he or she may send 408 an instruction to copy the selected network according to the resolution specified by the user and according to any filters specified by the user. In an embodiment where the network to be copied is operated by a remote computing services provider, sending the instruction may include invoking a web service provided by the remote computing services provider in order to send the instruction over a communications network. Other methods of sending the instruction may be used in accordance with various embodiments.

While FIG. 4 illustrates various steps performed in a particular order, variations are considered as being within the scope of the present disclosure. For instance, in an embodiment, network selection, filter selection, and copy resolution selection may be performed in any order and one or more steps may be performed simultaneously. Other variations are considered as being within the scope of the present disclosure.

Figure 5:
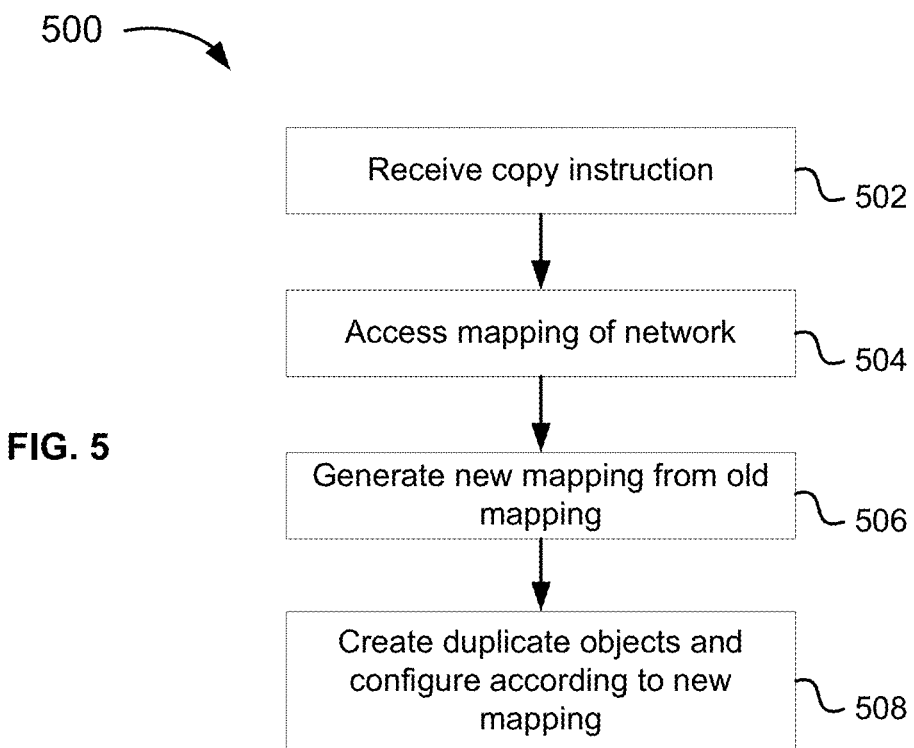
FIG. 5 is a flowchart for an illustrative example of a process for duplicating a network in response to receiving an instruction for duplicating a network, in accordance with an embodiment.

FIG. 5 provides an illustrative example of a process 500 for copying a network. The process 500 may be performed responsive to receipt of an instruction to copy the network generated in accordance with the embodiment illustrated in connection with FIG. 4. In an embodiment, a copy instruction is received 502. The instruction may identify a network to be copied, such as by an identifier of the network, a list of computing devices to be copied, or in any suitable manner. Responsive to the copy instruction, in an embodiment, a mapping of the network is accessed 504, in accordance with an embodiment. In an embodiment, a mapping of the network is one or more files or other collections of information that indicates how computing devices of the network to be copied are connected with one another.

When the mapping is accessed, in an embodiment, a new mapping is generated for a duplicate network. The new mapping may comprise a collection, such as a list, of network objects and their relationships with one another. Generating the new mapping may be accomplished by applying any user-selected filters and/or other criteria to the original mapping. Once the new mapping is generated, network objects are created according to the new mapping. In an embodiment, the new mapping may not be generated, such as when no filters or other criteria apply, and the original mapping may be used to create the duplicate network. In an embodiment, when the new mapping is generated, network objects are created 508 according to the new mapping, as described more fully below. In general, network objects that correspond to the network being copied are created according to the relationships among the network objects in the network.

Figure 6:
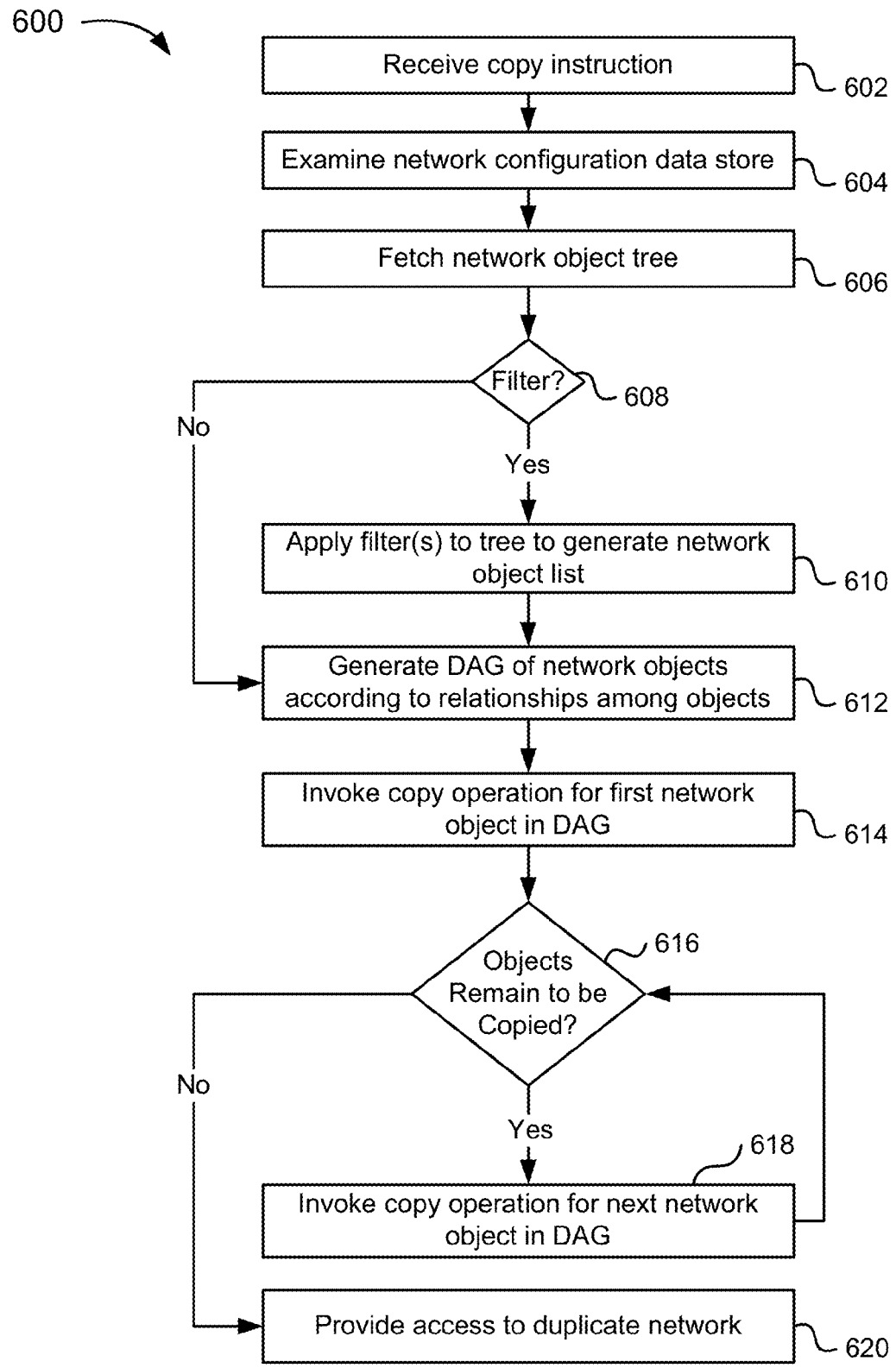
FIG. 6 is a flowchart for an illustrative example of a process for duplicating a network, in accordance with an embodiment.

FIG. 6 is a flowchart for an illustrative example of a process 600 for creating and providing access to a duplicate network, in accordance with an embodiment. Portions of the process 600 may correspond to portions of the process 500 described above in connection with FIG. 5. In an embodiment, a copy instruction is received 602, such as in a manner described above. A network configuration data store is examined 604 and a network object tree is fetched 606, in accordance with an embodiment. A network configuration data store may be a data store in which network objects of the network to be copied are persisted by a remote computing services provider. A network object tree, in an embodiment, is a graph comprising objects of a network and the relationships among the objects. The tree may be rooted at any suitable node.

Once the network object tree is fetched 606, in an embodiment, a determination is made 608 whether any filters apply to the network object tree. If it is determined that a filter applies to the network, the filter is applied 608 to the objects in the network object tree to generate a network object list. For example, if a user had specified that the duplicate network should only have network objects with one or more particular tags, objects having the one or more tags are identified and added to a list (or other collection) of network objects. Similarly, if the user had specified that only certain IP addresses are to be included in the duplicate network, only such network objects are added to a list. Generally, any criteria that the user specifies is used to determine what objects are added to the list of network objects, in accordance with an embodiment.

Once any applicable filters have been applied or if no filters apply, a directed acyclic graph (DAG) of network objects is generated 612, in accordance with an embodiment. The DAG of network objects, in an embodiment, is a graph whose nodes are network objects to be created for the duplicate network and whose edges have a direction according to dependency. The DAG may or may not be a connected graph. As an example, in an embodiment, virtual computing instances cannot be created without block storage devices being created for the virtual computing instances. Thus, in an embodiment, an edge in the DAG from a block storage device to a virtual computing instance that utilizes the block storage device for storage would have a direction from a node representing the block storage device to the virtual computing instance. While the present illustrative example uses DAGs for the purpose of illustration, any plan for duplication of a network may be used in accordance with various embodiments.

Once a DAG has been constructed, in an embodiment, a copy operation for a first network object in the DAG is invoked 614. The first network object may be any suitable network object represented by a node in the DAG, such as any node to which no edges are directed. Invoking the copy operation, in an embodiment, includes taking an action, the result of which will result in a copy of the network object being created. Invoking the copy operation, therefore, may include allocating sufficient computing resources for the network object copy and configuring the resources accordingly. For instance, if the network object is a virtual data storage volume, one or more physical storage devices may be allocated to the volume and the physical storage devices may be configured to serve the volume. If multiple physical storage devices serve the same virtual volume, a server that serves the multiple physical storage devices may likewise be allocated and configured. Generally, any computing resources may be allocated and configured in a suitable manner.

Once the copy operation has been invoked for the first network object in the DAG, a determination is made 616 whether other objects remain to be copied. If objects remain to be copied, the DAG is traversed to another node and a copy operation is invoked 618 for the next network object in the DAG. This process of traversing the DAG and determining whether other objects remain to be copied may continue until the DAG has been completely traversed. When the DAG is completely traversed, in an embodiment, access is provided 620 to a duplicate network consisting of the copied objects, in accordance with an embodiment. Providing access to the duplicate network may include providing one or more users of the customer the ability to direct operation of the network, configure the network, or otherwise access the network using a web service or otherwise.

Figure 7:
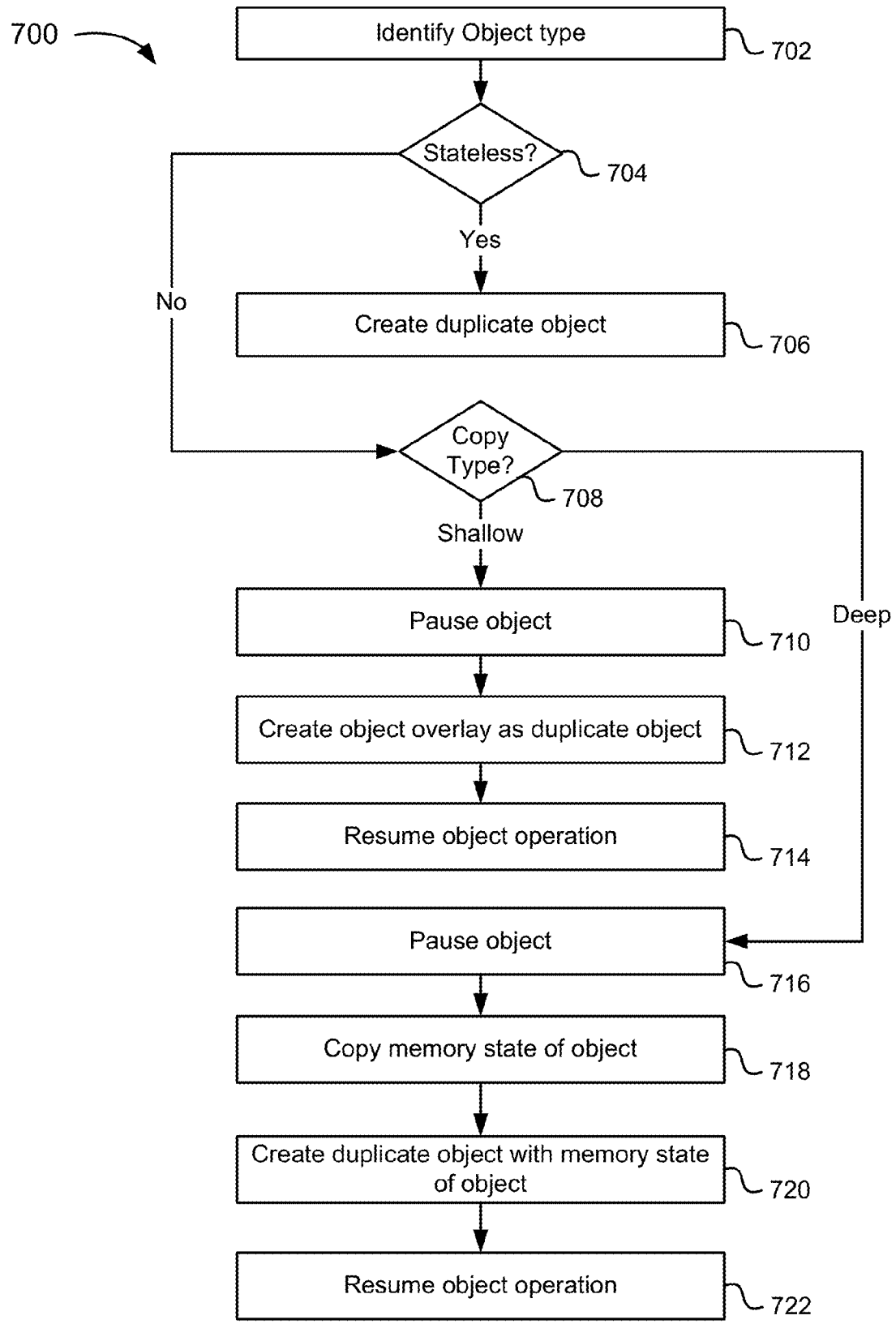
FIG. 7 is a flowchart for an illustrative example of a process for creating a copy of an object for a duplicate network, in accordance with an embodiment.

FIG. 7 shows an illustrative example of a process 700 for copying a network object, in accordance with an embodiment. The process 700 may be performed, for example, upon invocation of a copy operation as described in connection with FIG. 6. In an embodiment, when an object is to be copied, an object type is identified 702, in accordance with an embodiment. An object type may be one of various object types that can be used in a network environment. Examples include machines, storage devices, routers, switches, firewalls, and the like. In an embodiment, once the object type is identified, a determination is made 704 whether the object is stateless. An object may be stateless if the object whose configuration does not change as the object operates in a network. A server that treats each request it receives as independent and unrelated to any previous request may be a stateless object. Similarly, a switch whose configuration does not change may also be stateless. In an embodiment, objects that are not stateless are stateful, that is their configurations change during operation. A server whose operations depend on previous actions taken in the network, for example, is not stateless. Similarly, a storage volume whose configuration changes as data is written and/or deleted is not stateless.

If the object is stateless, then a duplicate object may be created 706 immediately. For example, resources may be provisioned and configured for the object so as to emulate the object. If, however, the object is not stateless, then more complex processes for copying the object may be necessary. For example, a determination may be made 708 regarding a copy type. In an embodiment, a copy may be one of two types, shallow or deep, although other types of copies may be made. A shallow copy of an object, in an embodiment, is an object that is at least an initially incomplete copy of an original object. A lazy copy is a type of shallow copy. With a shallow copy, information regarding the object copy's state may be available from the original object until that information is to change due to operation of the original object, at which point the information may be copied to the object copy before it is changed. An example is a copy-on-write (COW) overlay of a storage volume. When the COW overlay is initiated, a block of data for the COW overlay may be stored in the original storage volume until a write operation is requested for the block of data. When the write operation is requested for the block of data, the block is copied to the COW overlay and then performed for the original storage volume. In this manner, a copy may be made that is quickly and initially available for use. Similar types of copies may be made for any stateful object, such as virtual machines and, generally, any object whose state changes during operation.

A deep copy, on the other hand, may be a complete copy of an object such that, once the copy is made, it is not necessary to refer to the original object during the copy's operation. As an example, a deep copy of a storage volume may be made by copying exactly all of the data in the storage volume into a new volume such that any data that was stored in the original volume before the copy was made is accessible via the copy. Deep copies of virtual machines and other stateful objects may also be made. In this manner, the copy may become completely independent from the original object.

If, in an embodiment, a determination is made that the copy type is to be a shallow copy, the object is paused 710. Once the object is paused, an object overlay is created as a duplicate object 712 and the original object's operation is resumed 714. If, however, a determination is made that the copy is to be a deep copy, a deep copy of the object is made accordingly. For example, the object may be paused 716 and the memory state of the object may be copied 718. The copied memory state, in an embodiment, is used to create 720 a duplicate object and the operation of the original object is resumed 722.

Figure 8:
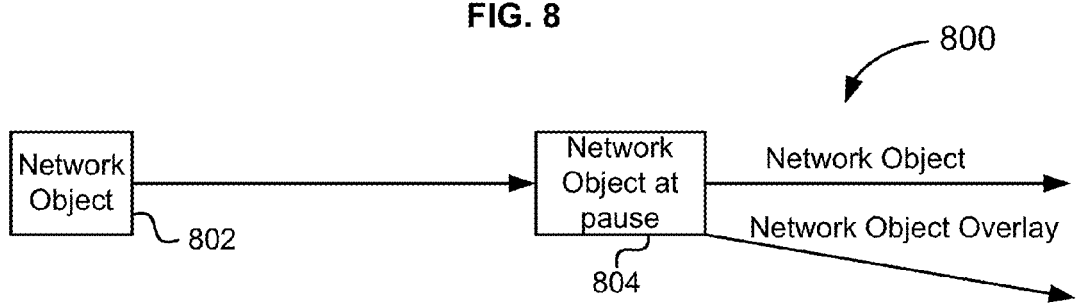
FIG. 8 is a diagram of a timeline that illustrates creation of a shallow copy of a network object, in accordance with an embodiment.
Figure 8:
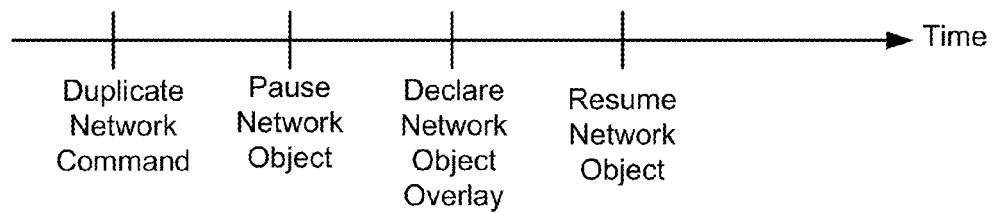
Figure 9:
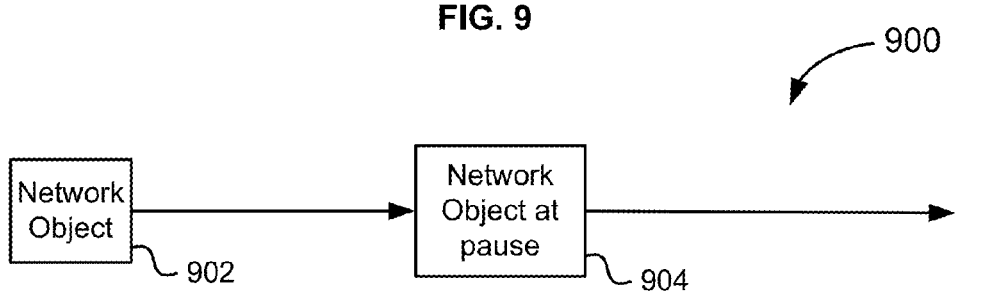
FIG. 9 is a diagram of a timeline that illustrates creation of a deep copy of a network object, in accordance with an embodiment.
Figure 9:
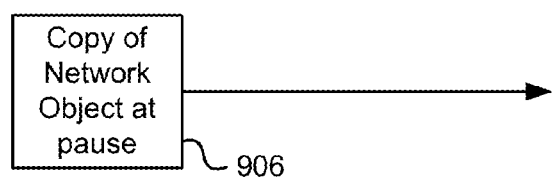
Figure 9:
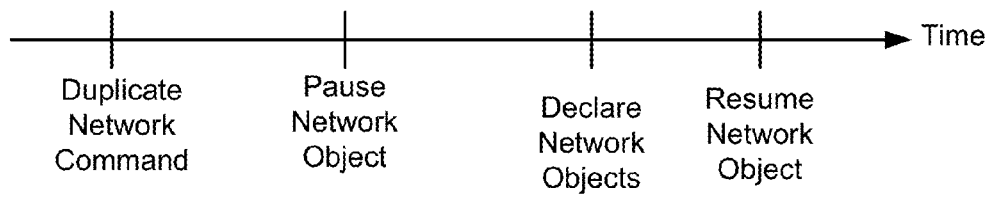

FIGS. 8 and 9 provide respective illustrative examples of how shallow and deep copies of network objects may be made in accordance with the various embodiments. Beginning with FIG. 8, the figure illustrates a timeline and an object's state with respect to the timeline. A network object 802 is operated during the normal course of operations and a request to duplicate a network of which the object is part is received. In an embodiment, network duplication proceeds, such as in a manner described above. At a point in time during network duplication, the network object 802 is paused. An overlay of the paused network object 804 is declared and the paused network object 804 is resumed. As illustrated in the drawing, when the network object is resumed, both the network object and the network object overlay proceed from a common state, the state of the network object at pause. When operations of the network object overlay require information regarding the state of the network object prior to network duplication, such information may be obtained from storage of the state of the network object at pause. Similarly, data may be written to the network object overlay as necessary, such as in the case of the network object overlay being a COW overlay, or at another convenient time, such as during times when the network traffic is relatively light.

Proceeding to FIG. 9, the figure similarly illustrates a timeline and an object's state with respect to the timeline. A network object 902 is operated during the normal course of operations and a request to duplicate a network of which the object is part is received. In an embodiment, network duplication proceeds, such as in a manner described above. At a point in time during network duplication, the network object 902 is paused. Information about the network object at pause 904 is copied to produce a copy of the network object at pause 906. For instance, all information regarding the state of the network object at pause 904 may be duplicated and stored in a separate location. In the example of the network object 902 being a virtual storage volume, the information stored in the virtual storage volume may be copied to one or more physical storage devices different from one or more physical storage devices used to store the virtual storage volume, or at least different locations on one or more of the same storage devices. In an embodiment, once the copy of the network object at pause is made, the network object at pause 904 is resumed. The network object and copy of the network object then proceed separately and independently.

While FIGS. 8 and 9 show illustrative examples of manners in which shallow and deep copies may be made, respectively, other methods may be used. As an example, the state of an object may be used as a basis for both the original object and the duplicate object. In other words, an object that has been copied may, after the copy, operate in a manner similar to the way the duplicate object operates, as described, referring to stored information about the object's state at the time of the copy, as necessary. As another example, when making a copy, techniques may be used that do not require pausing network objects if enough care is taken to ensure data integrity. For example, if care is made to record and account for changes to a network object during the duplication process, pausing may not be necessary. Generally, any technique for copying network objects, whether shallow or deep, may be used in accordance with the various embodiments of the present disclosure.

Figure 10:
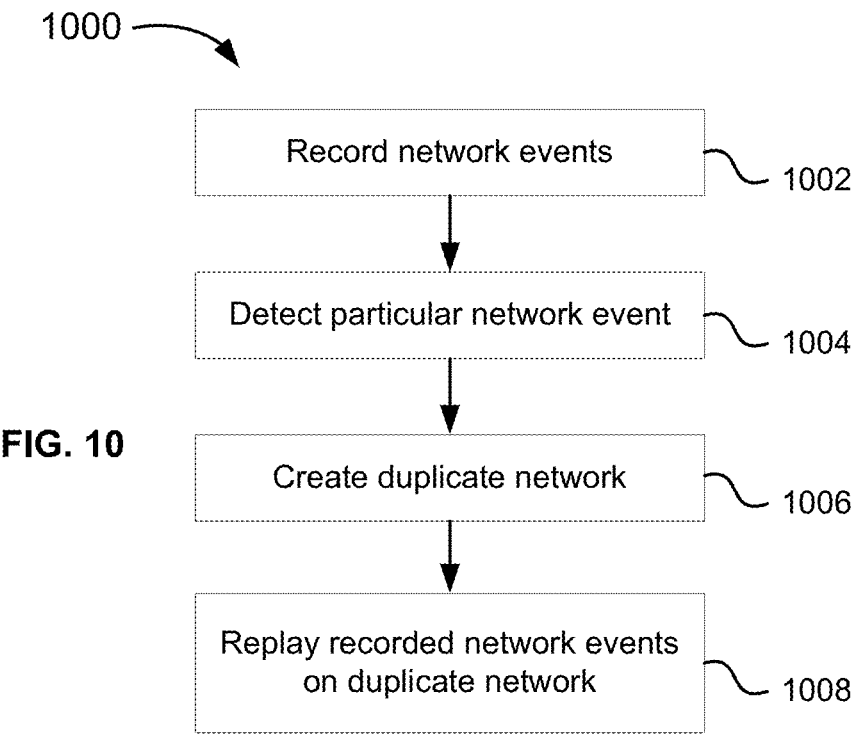
FIG. 10 is a flowchart for an illustrative example of utilizing a duplicate network, in accordance with an embodiment.

FIG. 10 shows an illustrative example of a process 1000 that may be used to take advantage of various embodiments of the present disclosure. The process 1000, for instance, may be used forensically to investigate various events that occur on a network. In an embodiment, network events are recorded 1002. Network events may be any events that occur in connection with the network including, but not limited to, transfer of information from one device to another, administrative changes to the network including administrative changes made using APIs, network auto-scaling events, operations on data sets such as read, write, or delete operations, and the like. Recording the network events may include storing information corresponding to the events in a manner such that the events may be at least partially reconstructed. Events may be recorded in a variety of ways. For example, in an embodiment, customers of a remote computing service provider may make API calls that affect the customers' networks in various ways, as determined by the API calls. These customer-initiated API calls (or, generally, any API calls that affect a network being copied) may be recorded. As another example, embodiments of the present disclosure used in connection with embodiments described in U.S. patent application Ser. No. 12/060,074, noted above, may involve routing network communications through one or more systems that are able to record packets traveling through the network, as well as routing information for the packets. While FIG. 10 shows recording network events as a discrete step in the process 1000, recording (and generally other actions of the various disclosed processes, and variations thereof) may take place continuously during performance of other actions, and/or in an order different from that which is illustrated.

In an embodiment, a particular network event is detected. A network administrator, for example, may notice that the network behaves apparently abnormally at a regular time, such as the same time every day. One or more applications may detect one or more anomalies in the network performance, such as an unusually high latency, traffic volume, or other characteristics regarding the performance of one or more devices in the network. Other network events that may be detected include auto-scaling events, device malfunction, and the like. Generally, any way of detecting any type of particular network event, or combination of events, may be used. When a particular network event is detected, a duplicate network may be created 1006, in accordance with an embodiment. For example, a network administrator may utilize the interface of a network management console to submit a request that the network be duplicated. A duplicate network may be created 1006 responsive to the request. Duplication of the network may be performed in a manner described above and may take into account various copy-type, resolution, and other criteria specified by the request. The duplicate network may include all of the objects in the original network or may have a different amount.

In an embodiment, when the duplicate network is created, recorded network events may be replayed 1008 on the duplicate network one or more times in order to allow analysis of the events. For example, events may be replayed and recorded on the duplicate network in order to identify the cause of the detected network events or, simply, to gain a further understanding of the network capabilities. In this manner, analysis with regard to the network operation may be performed on a duplicate network so as to allow the original network to continue normal operation. In other words, the duplicate network may be used for analysis while allowing the original network to operate normally, thereby allowing analysis of the network with minimal compromise to the network's performance.

Figure 11:
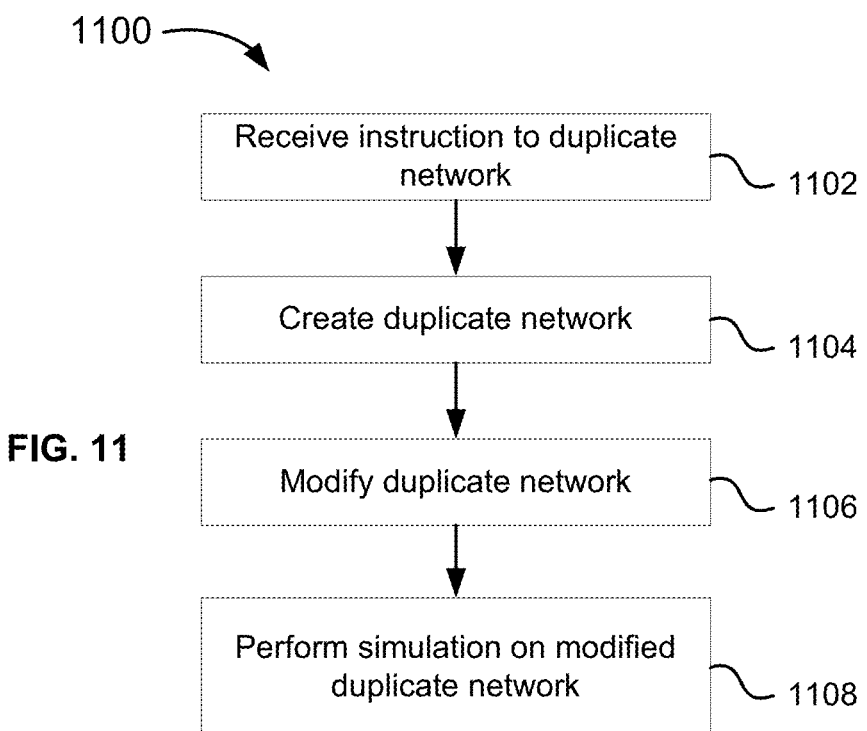
FIG. 11 is a flowchart for another illustrative example of utilizing a duplicate network, in accordance with an embodiment.

FIG. 11 illustrates another process 1100 that may be used in order to take advantage of the various embodiments of the present disclosure. The process 1100 may be used, for example, to allow a network administrator to study how a network will operate if certain changes are made before actually making the changes. In an embodiment, an instruction to duplicate a network is received 1102. The instruction to duplicate the network may be received in accordance with the above description. When the instruction to duplicate the network is received, a duplicate network is created 1104, such as in a manner described above.

With a duplicate network, a network administrator or other user may modify 1106 the duplicate network for various purposes. Modification of the duplication network, for example, may include reconfiguring devices in the network, adding and/or removing devices to/from the network, increasing bandwidth among various devices of the network, and the like. In an embodiment, upon modification of the duplicate network, the modified duplicate network may be used. For instance, the modified duplicate network may be used for simulation 1108 of how the network may respond under various stresses. A user may, for example, may send requests to various devices in the network in order to stress the network and measure how the modified duplicate network is able to handle the stress. For example, a user may stress a network to determine whether the modified duplicate network auto-scales one or more portions of the modified duplicate network in order to accommodate the additional stress. Generally, the user may cause various loads to be generated for the modified duplicate network. Loads may include requests to access information, to store information, to modify information stored in one or more data stores, to perform computations to be performed, and the like, multiple simultaneous connections to servers, and, in general, any action that can be performed by a network.

Further, portions of the processes described in connection with FIGS. 10 and 11, and other processes described herein, may be combined. For instance, network events may be recorded and then used for simulations on a modified duplicate network to enable determining whether any modifications made improved network performance. Other variations are also contemplated as being within the spirit of the present disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for network duplication, comprising:
   under the control of one or more computer systems configured with executable instructions,
   operating a first network based at least in part on instructions provided remotely by a customer, the first network including a plurality of virtual network devices in a configuration that overlays one or more physical networks, the first network including one or more devices selected from the group consisting of servers, storage volumes, switches, hubs, firewalls, bridges, and gateways;
   receiving, from the customer, a web service request to duplicate the first network;
   responsive to the web service request:

retrieving configuration information about the first network from a data store;
generating a network duplication plan from the retrieved configuration information;
creating, according to the network duplication plan, a plurality of virtual duplicate devices, each of the virtual duplicate devices corresponding to a device of the first network;
configuring, according to the network duplication plan, the created virtual duplicate devices in a duplicate network that overlays the one or more physical networks in a manner similar to the manner in which the first network overlays the one or more physical networks; and
operating the duplicate network based at least in part on instructions provided remotely by the customer.

2. The computer-implemented method of claim 1, wherein one or more of the virtual duplicate devices operate dependently from one or more stored state representations used by one or more corresponding devices of the first network.

3. The computer-implemented method of claim 1, wherein one or more of the virtual duplicate devices are complete copies of corresponding devices of the first network.

4. The computer-implemented method of claim 1, wherein the first network is a sub-network of a larger network, wherein receiving the request to duplicate the first network includes receiving one or more filtering criteria, and wherein the method further includes applying the one or more filtering criteria to the larger network to determine the first network.

5. The computer-implemented method of claim 1, wherein at least one of the virtual network devices of the first network was created using a template and wherein creating the plurality of virtual duplicate devices includes using the template to create at least one virtual duplicate device corresponding to said at least one of the virtual network devices.

6. A computer-implemented method for network duplication, comprising:
under the control of one or more computer systems configured with executable instructions,
receiving a request to duplicate a first network that includes one or more virtual devices and that overlays one or more physical networks, the first network including one or more devices selected from the group consisting of servers, storage volumes, switches, hubs, firewalls, bridges, and gateways;
responsive to receipt of the request, creating a plurality of virtual duplicate devices each corresponding to a device in the first network and arranging the created virtual duplicate devices in a duplicate network to overlay the one or more physical networks in a manner similar to the manner in which the first network overlays the one or more physical networks; and
providing access to the duplicate network.

7. The computer-implemented method of claim 6, wherein providing access to the duplicate network includes:
receiving instructions for performing a test of the duplicate network;
performing the test of the duplicate network; and
providing results of the test.

8. The computer-implemented method of claim 6, further comprising:
recording one or more network events for the first network; and
wherein providing access to the duplicate network includes causing the recorded one or more network events to occur on the duplicate network.

9. The computer-implemented method of claim 8, wherein recording the one or more network events includes recording one or more API calls affecting the first network and wherein causing the recorded one or more network events to occur on the duplicate network includes causing the one or more API calls to be made with respect to the duplicate network.

10. The computer-implemented method of claim 6, wherein providing access to the duplicate network includes:
modifying the duplicate network; and
performing a test on the modified duplicate network.

11. The computer-implemented method of claim 10, wherein modifying the duplicate network includes at least one of: changing capacity of at least one device of the duplicate network; causing a change in packet loss to the duplicate network; causing a change in failure rate in the duplicate network; or replacing one or more virtual duplicate devices with another virtual duplicate device that performs differently than the one or more virtual duplicate devices being replaced.

12. The computer-implemented method of claim 6, wherein at least one of the virtual network devices of the first network was created using a template and wherein creating the plurality of virtual duplicate devices includes using the template to create at least one virtual duplicate device corresponding to said at least one of the virtual network devices.

13. The computer-implemented method of claim 6, wherein creating the plurality of devices includes:
for a particular device of the first network, identifying whether the particular device is stateful device; and
when determined that the particular device is a stateful device, creating an copy of the particular device that operates operate dependently from one or more stored state representations used by the particular device.

14. One or more non-transitory computer-readable storage media having collectively stored thereon instructions that, when executed by one or more computer systems, cause the one or more computer systems to collectively at least:
receive a request to duplicate a first network that includes one or more virtual devices and that overlays one or more physical networks, the first network including one or more devices selected from the group consisting of servers, storage volumes, switches, hubs, firewalls, bridges, and gateways;
responsive to receipt of the request, create a duplicate network that overlays the one or more physical networks with a topology consistent with the first network and that includes one or more virtual duplicate devices that each correspond to one of the one or more virtual devices of the first network; and
provide access to the duplicate network.

15. The one or more non-transitory computer-readable storage media of claim 14, wherein providing access to the duplicate network includes:
receiving instructions for performing a test of the duplicate network;
performing the test of the duplicate network; and
providing results of the test.

16. The one or more non-transitory computer-readable storage media of claim 14, wherein the instructions further cause the one or more computer systems to collectively at least:
record one or more network events for the first network; and
wherein providing access to the duplicate network includes causing the recorded one or more network events to occur on the duplicate network.

17. The one or more non-transitory computer-readable storage media of claim 14, wherein creating the duplicate network includes configuring at least a subset of the duplicate virtual devices to have identifiers identical to identifiers of a set of the one or more virtual devices of the first network.

18. The one or more non-transitory computer-readable storage media of claim 14, wherein the identifiers are internet protocol addresses.

19. A computer system operable to duplicate networks, comprising:
  one or more processors; and
  memory, including executable instructions that, when executed by the one or more processors, cause the computer system to at least:
    receive a request to duplicate a first network that includes one or more virtual devices and that overlays one or more physical networks, the first network including one or more devices selected from the group consisting of servers, storage volumes, switches, hubs, firewalls, bridges, and gateways;
    responsive to receipt of the request, create a plurality of virtual duplicate devices each corresponding to a device in the first network and arranging the created devices in a virtual duplicate network to overlay the one or more physical networks in a manner similar to the manner in which the first network overlays the one or more physical networks; and
    provide access to the duplicate network.

20. The computer system of claim 19, wherein at least a subset of the created plurality of virtual duplicate devices are copy-on-write overlays of devices in the first network.

21. The computer system of claim 19, wherein providing access to the duplicate network includes:
  receiving instructions for performing a test of the duplicate network;
  performing the test of the duplicate network; and
  providing results of the test.

22. The computer system of claim 21, further comprising modifying the duplicate network prior to performing the test.

23. A computer-implemented method of network duplication, comprising:
  under the control of one or more computer systems configured with executable instructions,
    receiving a request to duplicate a first network that overlays one or more physical networks, the first network including one or more devices selected from the group consisting of servers, storage volumes, switches, hubs, firewalls, bridges, and gateways; and
    responsive to receipt of the request:
    creating a plurality of virtual devices and configuring the plurality of devices in a virtual network such that the plurality of virtual devices are communicatively connected with one another in a manner so as to overlay the one or more physical networks in a manner similar to the manner in which the first network overlays the one or more physical networks, the plurality of devices including one or more virtual devices that correspond to one or more devices of the first network.

24. The computer-implemented method of claim 23, wherein receiving the request includes receiving information specifying a fidelity for one or more devices of the first network; and
  wherein creating the new virtual network includes creating one or more duplicate virtual devices according to the specified fidelity.

25. The computer-implemented method of claim 23, wherein the request is received remotely from a user; and
  wherein creating the plurality of virtual devices is performed in a facility in which one or more other networks for one or more other users are operated.

26. The computer-implemented method of claim 23, wherein receiving the request to duplicate the first network includes receiving one or more filtering criteria, and wherein the method further includes applying the one or more filtering criteria to the larger network to determine said at least a subset of the first network.

27. The computer-implemented method of claim 23, wherein the first network is a virtual overlay network.

* * * * *

UNITED STATES PATENT AND TRADEMARK OFFICE
CERTIFICATE OF CORRECTION

PATENT NO. : 8,549,347 B1
APPLICATION NO. : 12/973744
DATED : October 1, 2013
INVENTOR(S) : Eric Jason Brandwine et al.

It is certified that error appears in the above-identified patent and that said Letters Patent is hereby corrected as shown below:

In the Claims:

Claim 13, Column 18, Line 27 that reads "whether the particular device is stateful device; and"
should read --whether the particular device is a stateful device; and--

Claim 13, Column 18, Line 29 that reads "device, creating an copy of the particular device that"
should read --device, creating a copy of the particular device that--

Claim 13, Column 18, Line 30 that reads "operates operate dependently from one or more stored"
should read --operates dependently from one or more stored--

Signed and Sealed this
Twenty-fourth Day of December, 2013

Margaret A. Focarino
*Commissioner for Patents of the United States Patent and Trademark Office*